United States Patent
Goodman

(10) Patent No.: US 11,411,211 B2
(45) Date of Patent: Aug. 9, 2022

(54) SOLID ELECTROLYTE-SECONDARY PARTICLE COMPOSITES

(71) Applicant: Advano, Inc., New Orleans, LA (US)

(72) Inventor: Jonathan Goodman, Evanston, IL (US)

(73) Assignee: Advano, Inc., New Orleans, LA (US)

( * ) Notice: Subject to any disclaimer, the term of this patent is extended or adjusted under 35 U.S.C. 154(b) by 85 days.

(21) Appl. No.: 16/938,280

(22) Filed: Jul. 24, 2020

(65) Prior Publication Data

US 2021/0351398 A1 Nov. 11, 2021

Related U.S. Application Data

(60) Provisional application No. 63/021,235, filed on May 7, 2020.

(51) Int. Cl.

| | | |
|---|---|---|
| *H01M 6/18* | (2006.01) | |
| *H01M 4/36* | (2006.01) | |
| *H01M 4/587* | (2010.01) | |
| *H01M 10/0562* | (2010.01) | |
| *H01M 4/58* | (2010.01) | |
| *H01M 4/02* | (2006.01) | |

(52) U.S. Cl.
CPC ........... *H01M 4/364* (2013.01); *H01M 4/582* (2013.01); *H01M 4/587* (2013.01); *H01M 10/0562* (2013.01); *H01M 2004/027* (2013.01); *H01M 2300/008* (2013.01)

(58) Field of Classification Search
CPC ...... H01M 4/362; H01M 4/364; H01M 4/366; H01M 4/582; H01M 4/587; H01M 4/583; H01M 4/58; H01M 10/0561; H01M 10/0562; H01M 2004/027; H01M 2004/026; H01M 2300/008; H01M 2300/0068; H01M 2300/0065
See application file for complete search history.

(56) References Cited

U.S. PATENT DOCUMENTS

| | | |
|---|---|---|
| 8,871,391 B2 | 10/2014 | Liang et al. |
| 8,889,295 B2 | 11/2014 | Yushin et al. |
| 9,373,838 B2 | 6/2016 | Yushin et al. |
| 9,543,564 B2 * | 1/2017 | Fasching ................. H01M 4/04 |
| 9,673,448 B2 | 6/2017 | Yushin et al. |
| 9,899,702 B2 | 2/2018 | Miyashita et al. |
| 10,147,950 B2 | 12/2018 | Sakshaug et al. |
| 10,195,583 B2 | 2/2019 | Costantino et al. |
| 10,454,103 B2 | 10/2019 | Sakshaug et al. |
| 10,461,320 B1 | 10/2019 | Xue et al. |
| 10,461,325 B1 | 10/2019 | Xue et al. |
| 10,476,071 B2 | 11/2019 | Yushin et al. |
| 10,581,066 B2 | 3/2020 | Guo et al. |
| 10,590,277 B2 | 3/2020 | Costantino et al. |
| 10,608,240 B1 | 3/2020 | Xue et al. |
| 2014/0199584 A1 * | 7/2014 | Kondo .................. H01M 4/131 429/163 |
| 2018/0083303 A1 | 3/2018 | Platt et al. |
| 2018/0145316 A1 * | 5/2018 | Moon ................. H01M 10/052 |
| 2019/0312304 A1 | 10/2019 | Uesugi et al. |
| 2020/0127325 A1 | 4/2020 | Takahashi et al. |

FOREIGN PATENT DOCUMENTS

| | | |
|---|---|---|
| WO | 2018183365 A1 | 10/2018 |
| WO | 2019051305 A1 | 3/2019 |

* cited by examiner

*Primary Examiner* — Raymond Alejandro
(74) *Attorney, Agent, or Firm* — Young Basile Hanlon & MacFarlane, P.C.

(57) ABSTRACT

Composite anode-active particulates that include lithium-active, silicon nanoparticles in carbon matrices impregnated with solid electrolyte are described with methods for their preparation. The composite active particulates preferably include a solid electrolyte phase carried within pores of the particulate.

9 Claims, 2 Drawing Sheets

SOLID ELECTROLYTE-SECONDARY PARTICLE COMPOSITES

CROSS-REFERENCE TO RELATED APPLICATIONS

This disclosure claims the benefit of priority to U.S. Patent Application No. 63/021,235, filed May 7, 2020, the entirety of which are incorporated herein.

FIELD OF THE INVENTION

Embodiments of the present invention relate to the structure, preparation, and use of particulates which include anode-active nanoparticles and solid electrolytic materials in lithium ion batteries.

BACKGROUND

Lithium-ion ($Li^+$) secondary or rechargeable batteries are now the most widely used secondary battery systems for portable electronic devices. However, the growth in power and energy densities for lithium ion battery technology has stagnated in recent years as materials that exhibit both high capacities and safe, stable cycling have been slow to be developed. Much of the current research effort for the next generation of higher energy capacity materials has revolved around using small or nanoparticulate active material bound together with conductive agents and carbonaceous binders.

There is a current and growing need for higher power and energy density battery systems. The power requirements for small scale devices such as microelectromechanical systems (MEMS), small dimensional sensor systems, and integrated on-chip microelectronics exceed the power densities of current $Li^+$ based energy storage systems. Power densities of at least 1 $J/mm^2$ are desired for effective function for such systems, and current energy densities for $Li^+$ thin film battery systems are about 0.02 $J/mm^2$. Three dimensional architectures for battery design can improve the areal power density of $Li^+$ secondary batteries by packing more active material per unit area without employing thicker films that are subject to excessive cycling fatigue. Three-dimensional Lithium-ion battery architectures also increase lithium ion diffusion by maximizing the surface area to volume ratio and by reducing diffusion lengths.

The current state-of-the-art for anode electrodes in lithium ion batteries includes the use of high surface area carbon materials. However, the capacity of any graphitic carbon, carbon black, or other carbonaceous material is limited to a theoretical maximum of 372 mAh/g and about 300 mAh/g in practice because carbon electrodes are usually formed of carbon particles mixed with a polymeric binder pressed together to form a bulk electrode. To store charge, $Li^+$ intercalates between the planes of $sp^2$ carbon atoms and this C—$Li^+$—C moiety is reduced. In addition, the maximum number of $Li^+$ that can be stored is one per every six carbon atoms ($LiC_6$). While the capacity of graphitic carbon is not terribly high, the intercalation process preserves the crystal structure of the graphitic carbon, and so cycle life can be very good.

A more recent and promising option for anode materials is silicon (Si). In contrast to the intercalative charge storage observed in graphite, Si forms an alloy with lithium. Silicon-based negative electrodes are attractive because their high theoretical specific capacity of about 4200 mAh/g, which far exceeds than that of carbon, and is second only to pure Li metal. This high capacity comes from the conversion of the Si electrode to a lithium silicide which at its maximum capacity has a formula of $Li_{22}Si_6$, storing over 25 times more Li per atom than carbon. The large influx of atoms upon alloying, however, causes volumetric expansion of the Si electrode of over 400%. This expansion causes strain in the electrode, and this strain is released by formation of fractures and eventual electrode failure. Repeated cycling between $Li_xSi_y$ and Si thus causes crumbling of the electrode and loss of interconnectivity of the material. For example, 1 μm thick Si film anodes have displayed short cyclability windows, with a precipitously capacity drop after only 20 cycles. Accordingly, new structures for silicon compositions and silicon containing laminates are needed.

SUMMARY

A first embodiment is a composite active particulate that includes an admixture of a heterogeneous matrix and a solid-electrolytic phase; the heterogeneous matrix includes a carbon phase carrying and/or having embedded therein a plurality of silicon nanoparticles, and a plurality of pores therewithin; and where the solid-electrolytic phase is carried within the pores of the heterogeneous matrix.

A second embodiment is a composite laminate carried on a current collector, the composite laminate includes an admixture of a heterogeneous matrix and a solid-electrolytic phase; the heterogeneous matrix includes a carbon phase carrying and/or having embedded therein a plurality of silicon nanoparticles, and a plurality of pores therewithin; and where the solid-electrolytic phase is carried within the pores of the heterogeneous matrix carried in solid-electrolytic continuous phase.

A third embodiment is a process for preparing a composite active particulate that includes providing an active particulate that includes a porous heterogeneous matrix, the porous heterogeneous matrix including a carbon phase carrying and/or having embedded therein a plurality of silicon nanoparticles, and a plurality of pores therewithin; providing a solution which includes a polysulfide, a solid-electrolyte particulate, and a solvent; admixing the active particulate and the solution thereby allowing the solution to penetrate pores of the active particulate; and thereafter removing the solvent.

A fourth embodiment is a process for preparing an anode that includes providing a plurality of active particulates that include a porous heterogeneous matrix, the porous heterogeneous matrix including a carbon phase carrying and/or having embedded therein a plurality of silicon nanoparticles, and a plurality of pores therewithin; providing a solution which includes a polysulfide, a solid-electrolyte particulate, and a solvent; admixing the active particulate and the solution thereby allowing the solution to penetrate pores of the active particulate; thereafter coating a current collector with the admixture of the active particulate and the solution thereby forming a coating on the current collector; and then removing the solvent from the coating on the current collector and thereby providing a composite laminate that includes composite active particulates in a solid-electrolytic continuous phase carried on the current collector, wherein the composite active particulates include a solid-electrolytic phase carried within the pores of the porous heterogeneous matrix, and wherein the solid-electrolytic phase is covalently affixed to the solid-electrolytic continuous phase.

BRIEF DESCRIPTION OF THE FIGURES

For a more complete understanding of the disclosure, reference should be made to the following detailed description and accompanying drawing figures wherein.

Figure 1:
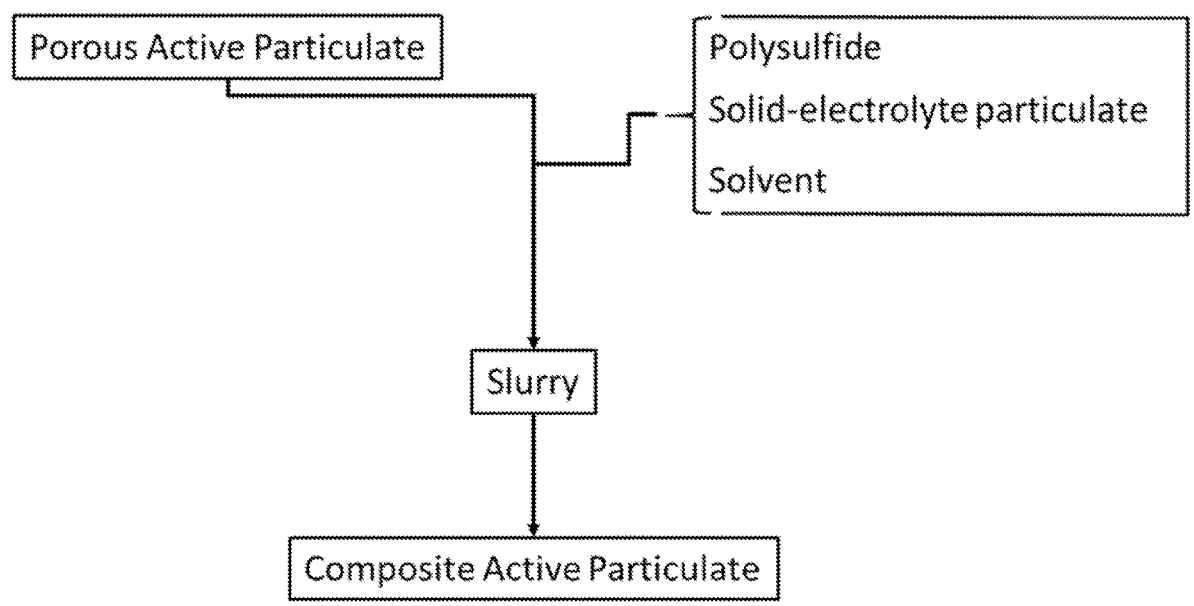
FIG. 1 is a first schematic of a process described herein.
Figure 2:
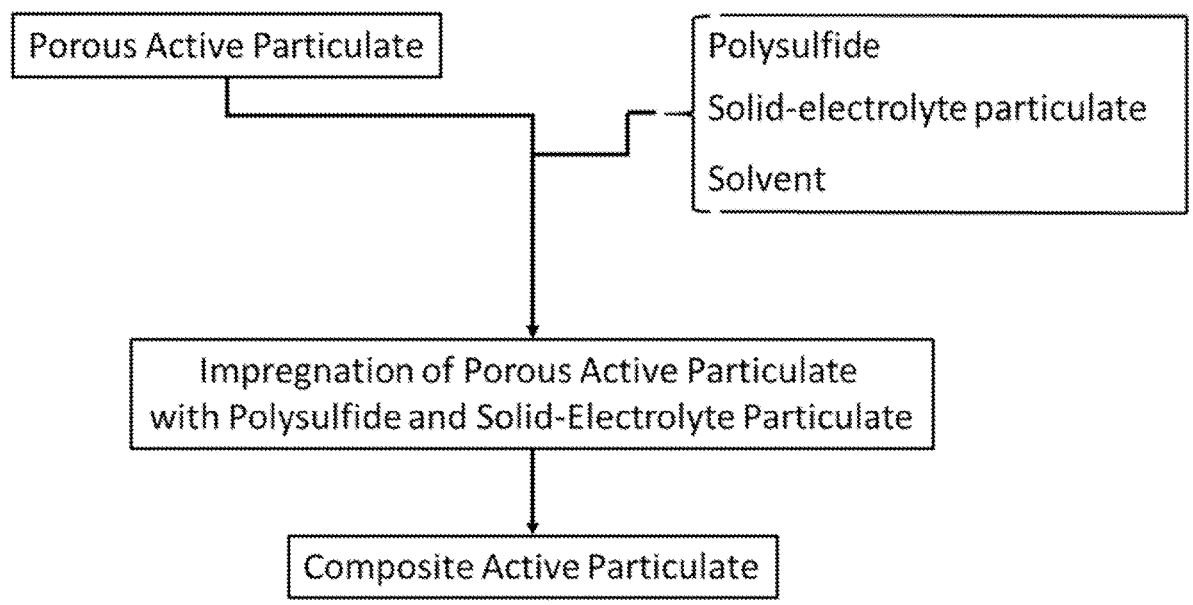
FIG. 2 is a second schematic of a process described herein.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or." Ranges include all specific values and subranges therebetween.

Herein are described products and processes which feature anode active materials and solid electrolytes or solid-electrolytic phases. One embodiment is a composite active particulate that includes a porous heterogeneous matrix and a solid-electrolytic phase. The porous heterogeneous matrix preferably includes a carbon phase carrying a plurality of silicon nanoparticles, where the carbon phase and silicon nanoparticles define a plurality of pores and a pore volume within the porous heterogeneous matrix. The solid-electrolytic phase is then carried within the pores of the porous heterogeneous matrix and adjacent to silicon nanoparticles.

In one instance, the composite active particulates have an average diameter of about 1 μm to about 100 μm. Preferably, composite active particulates have an average diameter of about 2 μm to about 75 μm, about 3 μm to about 65 μm, about 4 μm to about 50 μm, about 5 μm to about 30 μm, or about 5 μm to about 25 μm.

The composite active particulate is preferably an anode active material useful for lithium ion storage and release in a lithium-ion battery. Accordingly, the composite active material preferably has both electrical conductivity and ionic conductivity. In a preferable instance, the composite active particulate has a particle electrical conductivity in a range of about $10^{-4}$ to about $10^5$ S/cm, about $10^{-3}$ to about $10^5$ S/cm, about $10^{-2}$ to about $10^5$ S/cm, about $10^{-3}$ to about $10^4$ S/cm, about $10^{-3}$ to about $10^3$ S/cm, about $10^{-2}$ to about $10^5$ S/cm, about 0.1 to about $10^5$ S/cm, or about 1 to about $10^5$ S/cm. Still further, the composite active particulate, preferably, has a particle ionic conductivity in a range of about $10^{-6}$ to about $10^{-1}$ S/cm, about $10^{-5}$ to about $10^{-1}$ S/cm, about $10^{-4}$ to about $10^{-1}$ S/cm, or about $10^{-3}$ to about $10^{-1}$ S/cm. More preferably, the particle ionic conductivity is greater than about $10^{-5}$, about $10^{-4}$, about $10^{-3}$, of about $10^{-2}$ S/cm.

In one instance, the solid-electrolytic phase occupies between about 10% and about 50% of the pore volume as defined by the porous heterogeneous matrix. In another instance, the porous heterogeneous matrix has a pore volume equal to or greater than a silicon nanoparticle volume. In one example, the pore volume is at least 100%, 125%, 150%, 175%, 200%, 225%, 250%, 275%, or 300% of the silicon nanoparticle volume. While the solid-electrolytic phase can occupy/fill up to 100% of the pore volume, the composite active particulate, preferably, has sufficient unoccupied/open pore volume to accommodate a lithiated silicon species generated during the charge/discharge cycle of a lithium ion battery. Herewith, the composite active particulate preferably has an open pore volume of about 0.01 to about 0.2 cm$^3$/g, whereas the porous heterogeneous matrix had, prior to the addition of the solid-electrolytic phase a pore volume of about 0.01 to about 0.25 cm$^3$/g.

Examples of porous heterogeneous matrices useful herein, include but are not limited to those described in U.S. Pat. Nos. 10,590,277, 10,476,071, 10,454,103, 10,195,583, 10,147,950, 10,461,325, 10,461,320, 10,608,240, 9,673, 448, 9,373,838, 8,889,295, and US Pat. Pub. 2018/0145316, the disclosures of which are incorporated herein.

In one example, the carbon phase can be a soft carbon; in another example, the carbon phase can be a hard carbon. In still another example, the carbon phase is an admixture of soft and hard carbon. Preferably, the carbon phase is electronically conductive; that is, the carbon phase conducts electrons to and from the silicon nanoparticles carried within the composite active particulate to a surface of the composite active particulate. In a particular instance, the carbon phase can have an electrical conductivity in a range of about $10^{-4}$ to about $10^5$ S/cm, about $10^{-3}$ to about $10^5$ S/cm, about $10^{-2}$ to about $10^5$ S/cm, about $10^{-3}$ to about $10^4$ S/cm, about $10^{-3}$ to about $10^3$ S/cm, about $10^{-2}$ to about $10^5$ S/cm, about 0.1 to about $10^5$ S/cm, or about 1 to about $10^5$ S/cm.

The carbon phase can include, consists essentially of, or consist of reduced carbon. As used herein and as represented in the heterogeneous matrix, reduced carbon, i.e., elemental carbon, and can be an amorphous carbon, graphite, graphene, porous carbon, diamond, other polymorph, or mixture thereof. The reduced carbon is typically a thermally processed organic compound, e.g., a carbon matrix precursor, that is treated at a temperature and pressure that converts the organic compound to inorganic carbon (elemental carbon and its polymorphs). Typically, reduced carbon (phase) is insufficiently conductive for the use of the material in battery applications, accordingly, the carbon phase can further include a conductive carbon. The conductive carbon can be selected from carbon nanotubes, carbon nanofibers, C65, C45, graphene, graphene oxide, reduced graphene oxide, mesocarbon microbeads, or a mixture thereof. Specific examples include Super P (e.g., MTI), Super C65 (e.g., IMERY), Super C45 (e.g., IMERY), TIMREX KS6 (e.g., MTI), and KS6L (e.g., IMERY). Preferably, the composite active particulate includes about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, or 10 wt. % of the conductive carbon. In certain instances, the carbon phase is an admixture of conductive carbon and the reduced carbon, and has an electrical conductivity in a range of about $10^{-4}$ to about $10^5$ S/cm, about $10^{-3}$ to about $10^5$ S/cm, about $10^{-2}$ to about $10^5$ S/cm, about $10^{-3}$ to about $10^4$ S/cm, about $10^{-3}$ to about $10^3$ S/cm, about $10^{-2}$ to about $10^5$ S/cm, about 0.1 to about $10^5$ S/cm, or about 1 to about $10^5$ S/cm.

The silicon nanoparticles, preferably, include greater than about 70 wt. %, 75 wt. %, 80 wt. %, 85 wt. %, 90 wt. %, about 95 wt. %, about 98 wt. %, about 99 wt. %, about 99.5 wt. %, or about 99.9 wt. % silicon. In one instance, the silicon nanoparticles consist essentially of silicon. In another instance, the silicon nanoparticles consist of amorphous silicon. In one example, the silicon nanoparticles include amorphous hydrogenated silicon (a-Si:H). In another example, the silicon nanoparticles include n-doped or p-doped silicon.

In yet another example, the silicon nanoparticles include a silicon alloy. The silicon alloy can be a binary alloy (silicon plus one alloying element), can be a tertiary alloy, or can include a plurality of alloying elements. The silicon alloy is understood to include a majority silicon. A majority silicon means that the nanoparticles have a weight percentage that is greater than about 50% (50 wt. %) silicon, preferably greater than about 60 wt. %, 70 wt. %, 80 wt. %, 90 wt. %, 95 wt. %, 96 wt. %, 97 wt. %, 98 wt. %, 99 wt. %, or 99.5 wt. % silicon. The alloying element can be, for example, an alkali metal, an alkaline-earth metal, a Group 13 to 16 element, a transition metal group element, a rare earth group element, or a combination thereof, but, obviously, not Si. The alloying element can be, for example, Li, Na, Mg, Ca, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, B, Al, Ga, In, Ge, Sn, P, As, Sb, Bi, S, Se, Te, or a combination thereof. In one instance, the alloying element can be lithium, magnesium, aluminum, titanium, vanadium, chromium, manganese, iron, cobalt, nickel, copper, or a mixture thereof. In another instance, the alloying element can be selected from copper, silver, gold, or a mixture thereof. In still another instance, the silicon alloy can be selected from a SiTiNi alloy, a SiAlMn alloy, a SiAlFe alloy, a SiFeCu alloy, a SiCuMn alloy, a SiMgAl alloy, a SiMgCu alloy, or a combination thereof.

As the term alloy typically infers a homogeneous distribution of the alloying element(s) in the base material, silicon, the silicon nanoparticles can further include a heterogeneous distribution of alloying elements in the nanoparticles. In some instances, these alloy elements form intermetallics in the silicon nanoparticles. An intermetallic (also called an intermetallic compound, intermetallic alloy, ordered intermetallic alloy, and a long-range-ordered alloy) is an alloy that forms a solid-state compound exhibiting defined stoichiometry and ordered crystal structure; here, within the amorphous silicon nanoparticle composition (e.g., a NiSi intermetallic within Si).

The silicon nanoparticles, preferably, have an average diameter of less than about 1,000 nm, 900 nm, 800 nm, 700 nm, 600 nm, 500 nm, 400 nm, 300 nm, or 250 nm. In another instance, the silicon nanoparticles have an average diameter of from about 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 100 nm to about 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm. In specific instances, the silicon nanoparticles have an average diameter of about 50 nm to about 1,000 nm, about 50 nm to about 800 nm, about 50 nm to about 750 nm, about 50 nm to about 700 nm, about 50 nm to about 650 nm, about 50 nm to about 600 nm, about 50 nm to about 550 nm, about 50 nm to about 500 nm, about 50 nm to about 450 nm, about 50 nm to about 400 nm, about 50 nm to about 350 nm, about 50 nm to about 300 nm, about 100 nm to about 750 nm, about 100 nm to about 600 nm, about 100 nm to about 500 nm, about 100 nm to about 400 nm, or about 100 nm to about 300 nm. In one instance, silicon nanoparticles have a spherical morphology. In another instance, the silicon nanoparticles can have a plate-like morphology.

The solid-electrolytic phase is preferably a lithium metal sulfide, for example a lithium borosulfide, a lithium phosphosulfide. In this use, the "metal" can be a transition metal element and/or a main group element. In one instance, the solid-electrolytic phase can have a formula of $Li_xM_yS_z$ or $Li_xM_yS_zR_n$, where M includes B and/or P, where R is a halide, and where x, y, z, and n are positive integers. The solid-electrolytic phase can further feature a formula where M further includes As, Ge, Ga, Sb, Si, Sn, Al, In, Ti, V, Nb, Ta, and/or Zn; that is, in addition to B and/or P. Preferably, M includes Si, Sn, Ge, and/or Zn. Examples of lithium metal sulfide, solid-electrolytic phases include but are not limited to $Li_{4-x}M_{1-x}M'_xS_4$ wherein M is Si, Ge, or a mixture thereof, where M' is P, Al, Zn, Ga, or a mixture thereof, and where x is a value from about 0.1 to about 0.9; $L_{10+x}(Sn_ySi_{1+x}P_{2-x}S_{12}$ where x is from about 0 to about 2, and wherein y is from about 0 to 1; $Li_6PS_5X$ where X is F, Cl, Br, I, or a mixture thereof; $Li_{6+x}P_{1-x}Si_xS_5Br$ where x is from about 0 to 1; $Li_{1+2x}Zn_{1-x}PS_4$, wherein x is from about 0 to 1; $Li_{7-x-2y}PS_{6-x-y}Cl_x$, where $0.8 \le x \le 1.7$ and $0 < y \le -0.25x+0.5$; $Li_{7-x+y}PS_{6-x}Cl_{x+y}$, where $0.05 \le y \le 0.9$ and $-3.0x+1.8 \le y \le -3.0x+5.7$; $Li_{7-x}MS_{6-x}X_x$ where X is Cl or Br, M is P, B, or a mixture thereof, and x is 0.2 to 1.8; $Li_{3x}[Li_xSn_{1-x}S_2]$ where x is from about 0 to about 1; and $Li_{(12-n-x)}B''^{n+}X_{6-x}Y^-_x$, where $B''^{n+}$ is selected from the group consisting of P, As, Ge, Ga, Sb, Sn, Al, In, Ti, V, Nb and Ta; X is selected from the group consisting of S, Se and Te; and $Y^-$ is selected from the group consisting of Cl, Br, I, CN, OCN, SCN, and $N_3$, while $0 \le x \le 2$. Specific examples of lithium metal sulfide, solid-electrolytic phases include but are not limited to $Li_9B_{19}S_{33}$; $Li_5B_7S_{13}$; $Li_2B_2S_5$; $Li_3BS_3$; $Li_7P_3S_{11}$; $Li_3PS_4$; $Li[Li_{0.33}Sn_{0.67}S_2]$; $Li_{0.6}[Li_{0.2}Sn_{0.8}S_2]$; $Li_{11}Si_2PS_{12}$; $Li_{9.54}Si_{1.74}P_{1.44}S_{11.7}Cl_{0.3}$; $Li_{10}Si_{0.5}Ge_{0.5}P_2S_{12}$; $Li_{10}Sn_{0.5}Ge_{0.5}P_2S_{12}$; $Li_{10}Si_{0.5}Sn_{0.5}P_2S_{12}$; $Li_{10}GeP_2S_{11.7}O_{0.3}$; $Li_{9.6}P_3S_{12}$; $Li_9P_3S_9O_3$; $Li_{10.35}Ge_{1.35}P_{1.65}S_{12}$; $Li_{10.35}Si_{1.35}P_{1.65}S_{12}$; $Li_{9.81}Sn_{0.81}P_{2.19}S_{12}$; $Li_{9.42}Si_{1.02}P_{2.1}S_{9.96}O_{0.24}$; $Li_{10}GeP_2S_{12}$; $Li_{13}GeP_3S_{12}$; $Li_{10}SnP_2S_{12}$, or mixtures thereof. Particularly preferable lithium metal sulfide, solid-electrolytic phases include $Li_xM_yS_z$ where M includes B and/or P, where x, y, and z are positive integers; and $Li_{x'}M_{y'}S_{z'}R_{n'}$, where M includes B and/or P, where R is a halide, preferably selected from Cl and Br, and where x', y', z', and n' are positive integers. Herewith, the values x, y, z, n, and the primes thereof are preferably positive integers and while some solid-electrolytic phases are described in terms of fractional values, these are not exclusive; for example, $Li_{9.6}P_3S_{12}$ (included in the above list) can be represented as $Li_{96}P_{30}S_{130}$, $Li_{16}P_5S_{20}$ or $Li_{16}(PS_4)_5$.

A second embodiment is a process for preparing a composite active particulate described above. That is, the process provides a composite active particulate which includes a porous heterogeneous matrix and a solid-electrolytic phase carried within the pores and adjacent to silicon nanoparticles. The process, preferably, includes admixing a solution of a polysulfide and a solid-electrolyte particulate with an active porous particulate, thereby impregnating pores of the active porous particulate with the polysulfide and the solid-electrolyte particulate. Preferably, the admixture includes a mass ratio of the active porous particulate to the solid-electrolyte particulates of about 10:1, about 9:1, about 8:1, about 7:1, about 6:1 about 5:1 about 4:1, about 3:1, about 2:1 on a dry basis. That is, on a dry mass basis, there is a greater amount of the active porous particulate than solid-electrolyte particulates. The active porous particulates can have an average diameter of about 1 μm to about 100 μm. Preferably, active porous particulates have an average diameter of about 2 µm to about 75 µm, about 3 µm to about 65 µm, about 4 µm to about 50 µm, about 5 µm to about 30 µm, or about 5 µm to about 25 µm. Wherein the solid-electrolyte particles, preferably, have an average particle diameter of about 5 nm to about 250 nm, or an average diameter of from about 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 100 nm to about 100 nm, 150 nm, 200 nm, 250 nm, 300 nm, 350 nm, 400 nm, 450 nm, 500 nm.

Thereafter, the polysulfide and the solid-electrolyte particulate are converted to the solid-electrolytic phase within the active porous particulate. One instance includes providing an active particulate that includes a porous heterogeneous matrix. The porous heterogeneous matrix, preferably, includes a carbon phase carrying a plurality of silicon nanoparticles. Therein, the carbon phase and silicon nanoparticles define a plurality of pores within the porous heterogeneous matrix.

The process can further include providing a solution of a polysulfide, a solid-electrolyte particulate, and a solvent. In one instance, the solution can be provided by admixing the components. Notably, while the term solution is used herein, the specific phase of the mixture can be a slurry. Preferably, all of the components dissolve in or have solubility in the solvent. In another instance, the polysulfide stabilizes the dispersion of the solid-electrolyte particulates in the solvent.

The process can then further include admixing the active particulate and the solution thereby allowing the solution to penetrate pores of the active particulate. In one preferable instance, the active particulate is dry prior to admixing with the solution. In another instance, the active particulate is slurried in the solvent or a second solvent prior to admixing with the solution. In still another instance, the active particulate is slurring in a solvent or second solvent with polysulfide prior to admixing with the solid-electrolyte particulate. In yet another instance, the active particulate is wetted with a second solvent that is immiscible in the solvent that is part of the solution; thereby when the wetted-active particulates is admixed with the solution, the solution does not fully penetrate the pores of the active particulate. In still another instance, the active particulate and the solution are admixed and then exposed to a vacuum to reduce the localized pressure within the pores of the active particulate, and then the vacuum is broken thereby driving the solution into the pores.

The process can still further include removing the solvent and thereby providing the composite active particulate. In one instance, the solvent can be removed by vacuum distillation. In another instance, the solvent can be removed by solvent exchange. In another instance, the solvent is removed by distillation at an elevated (greater than 30° C.) temperature. Still further, the process can include heating the composite active particulate to a temperature of about 50° C. to about 600° C., about 50° C. to about 500° C., about 50° C. to about 450° C., about 75° C. to about 400° C., about 100° C. to about 400° C., about 100° C. to about 350° C., or about 100° C. to about 300° C.

The solid-electrolytic phase is preferably a lithium metal sulfide, for example a lithium borosulfide, a lithium phosphosulfide. In this use, the "metal" can be a transition metal element and/or a main group element. Examples of lithium metal sulfide, solid-electrolytic phases include but are not limited to $Li_{4-x}M_{1-x}M'_xS_4$ wherein M is Si, Ge, or a mixture thereof, where M' is P, Al, Zn, Ga, or a mixture thereof, and where x is a value from about 0.1 to about 0.9; $Li_{10+x}(Sn_ySi_{1-y})_{1+x}P_{2-x}S_{12}$ where x is from about 0 to about 2, and wherein y is from about 0 to 1; $Li_6PS_5X$ where X is F, Cl, Br, I, or a mixture thereof; $Li_{6+x}P_{1-x}Si_xS_5Br$ where x is from about 0 to 1; $Li_{1+2x}Zn_{1-x}PS_4$, wherein x is from about 0 to 1; $Li_{7-x-2y}PS_{6-x-y}Cl_x$, where $0.8 \leq x \leq 1.7$ and $0 < y \leq -0.25x + 0.5$; $Li_{7-x+y}PS_{6-x}Cl_{x+y}$, where $0.05 \leq y \leq 0.9$ and $-3.0x + 1.8 \leq y \leq -3.0x + 5.7$; $Li_{7-x}MS_{6-x}X_x$ where X is Cl or Br, M is P, B, or a mixture thereof, and x is 0.2 to 1.8; $Li_{3x}[Li_xSn_{1-x}S_2]$ where x is from about 0 to about 1; and $Li_{(12-n-x)}B^{n+}X_{6-x}Y^-_x$, where $B^{n+}$ is selected from the group consisting of P, As, Ge, Ga, Sb, Sn, Al, In, Ti, V, Nb and Ta; X is selected from the group consisting of S, Se and Te; and $Y^-$ is selected from the group consisting of Cl, Br, I, F, CN, OCN, SCN, and $N_3$, while $0 \leq x \leq 2$. Specific examples of lithium metal sulfide, solid-electrolytic phases include but are not limited to $Li_9B_{19}S_{33}$; $Li_5B_7S_{13}$; $Li_2B_2S_5$; $Li_3BS_3$; $Li_7P_3S_{11}$; $Li_3PS_4$; $Li[Li_{0.33}Sn_{0.67}S_2]$; $Li_{0.6}[Li_{0.2}Sn_{0.8}S_2]$; $Li_{11}Si_2PS_{12}$; $Li_{9.54}Si_{1.74}P_{1.44}S_{11.7}Cl_{0.3}$; $Li_{10}Si_{0.5}Ge_{0.5}P_2S_{12}$; $Li_{10}Sn_{0.5}Ge_{0.5}P_2S_{12}$; $Li_{10}Si_{0.5}Sn_{0.5}P_2S_{12}$; $Li_{10}GeP_2S_{11.7}O_{0.3}$; $Li_{9.6}P_3S_{12}$; $Li_9P_3S_9O_3$; $Li_{10.35}Ge_{1.35}P_{1.65}S_{12}$; $Li_{10.35}Si_{1.35}P_{1.65}S_{12}$; $Li_{9.81}Sn_{0.81}P_{2.19}S_{12}$; $Li_{9.42}Si_{1.02}P_{2.1}S_{9.96}O_{2.04}$; $Li_{10}GeP_2S_{12}$; $Li_{13}GeP_3S_{12}$; $Li_{10}SnP_2S_{12}$, or mixtures thereof. Particularly preferable lithium metal sulfide, solid-electrolytic phases include $Li_xM_yS_z$ where M includes B and/or P, where x, y, and z are positive integers; and $Li_xM_yS_zR_n$, where M includes B and/or P, where R is a halide, preferably selected from Cl and Br, and where x', y', z', and n' are positive integers.

Notably, the solid-electrolyte particles and the solid-electrolytic phase can have different ratios of M (e.g., B/P) to S. For example, the solid-electrolyte particles can be solid-sulfide-electrolyte nanoparticles which have a formula of $Li_xM_yS_z$ where M includes B and/or P, where x, y, and z are positive integers, and have an electrolyte nanoparticle S to M ratio of z:y; where the solid-electrolytic phase then can have a formula of $Li_{x'}M_{y'}S_{z'}$ where M includes B and/or P, and where x', y', and z' are positive integers, and has an electrolyte phase S to M ratio of z':y'. Accordingly, the solid-electrolytic phase S to M ratio is greater (includes more sulfur) than the solid-sulfide-electrolyte nanoparticle S to M ratio. The solid-sulfide-electrolyte nanoparticles and the solid-electrolytic phase can further feature a formula where M further includes As, Ge, Ga, Sb, Si, Sn, Al, In, Ti, V, Nb, Ta, and/or Zn. That is, in addition to B and/or P. Preferably, M includes Si, Sn, Ge, and/or Zn. In another example, the solid-electrolyte particles can be solid-sulfide-electrolyte nanoparticles which have a formula of $Li_xM_yS_zR_n$, where M includes B and/or P, where R is a halide (e.g., Cl or Br), and where x, y, z, and n are positive integers, and have an electrolyte nanoparticle S to M ratio of z:y; where the solid-electrolytic phase can then have a formula of $Li_{x'}M_{y'}S^{z'}R_{n'}$ where M includes B and/or P, where R is a halide (e.g., Cl or Br), and where x', y', z', and n' are positive integers, and has an electrolyte phase S to M ratio of z':y'. Accordingly, the solid-electrolytic phase S to M ratio is greater (includes more sulfur) than the solid-sulfide-electrolyte nanoparticle S to M ratio. In another instance, the solid-electrolytic phase can include about 0.01 at. % to about 20 at. %, about 0.01 at. % to about 15 at. %, about 0.01 at. % to about 10 at. %, about 0.01 at. % to about 5 at. %, or about 0.01 at. % to about 2.5 at. % more sulfur than the solid-electrolyte nanoparticle.

The solid-electrolyte particulates can have a plurality of sizes but preferably the solid-electrolyte particulates have an average particle diameter of about 5 nm to about 250 nm, or an average diameter of from about 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 100 nm to about 100 nm, 150 nm, 200 nm, 250 nm, 300 nm, 350 nm, 400 nm, 450 nm, 500 nm.

The polysulfide can be a lithium polysulfide, a sodium polysulfide, an ammonium polysulfide, an alkylammonium polysulfide, or a mixture thereof. The polysulfide is preferably a lithium polysulfide having the formula $Li_2S_x$ where x is in the range of 1 to about 24, preferably, 2 to about 18, 2 to about 12, 2 to about 10, 2 to about 8, 2 to about 6, or 2 to about 4. The solvent, or polysulfide solution solvent, can be water (e.g., an ammonium hydroxide solution) or an ether, preferably, the solvent is an ether. The ether can be selected from tetrahydrofuran (THF), tetrahydropyran, 2,2,5,5-tetramethyl tetrahydrofuran, 2-methyl tetrahydrofuran, methyl t-butyl ether, ethyl t-butyl ether, 1,4-dioxane, 1,3-dioxane, dimethoxyethane, diisopropylether, dibutyl ether, diethyl ether, and mixtures thereof. In one preferable instance, the solvent is THF. In another preferable instance, the solvent is dimethoxyethane. In still another preferable instance, the solvent is 1,4-dioxane. In yet another preferable instance, the solvent is tetrahydropyran.

In another instance, the polysulfide in the solution includes a sulfur compound and a solvent. The sulfur compound can be sulfur (elemental sulfur, e.g. $S_8$ or $S_7$), phosphorous pentasulfide ($P_2S_5$ or $P_4S_{10}$), boron sulfide ($B_2S_3$), or a mixture thereof. In one preferably instance, the sulfur compound is elemental sulfur. In another preferable instance, the sulfur compound is phosphorus pentasulfide when the solid-electrolyte nanoparticles include lithium phosphorous sulfides; and is boron sulfide when the solid-electrolyte nanoparticles include lithium boron sulfides. In yet another example, the sulfur compound can be phosphorus pentasulfide when the solid-electrolyte nanoparticles include lithium boron sulfides; and can be boron sulfide when the solid-electrolyte nanoparticles include lithium phosphorous sulfides. In this instance, the solvent is preferably one that can dissolve the sulfur compound. Accordingly, the solvent can be selected from carbon disulfide, pyridine, and a mixture thereof. In one preferable instance, the solvent is carbon disulfide. In another instance, wherein the sulfur compound is phosphorous pentasulfide and/or boron sulfide, the solvent can be pyridine.

The solution, preferably, includes about 1 wt. % to about 50 wt. % polysulfide and about 50 wt. % to about 99 wt. % solid-electrolyte particulate on a dry basis. In another example, the solution includes about 1 wt. % to about 25 wt. % polysulfide and about 75 wt. % to about 99 wt. % solid-electrolyte particulate on a dry basis.

A third embodiment is a composite laminate carried on a current collector, the composite laminate preferably includes a plurality of composite active particulates carried in a solid-electrolytic continuous phase. Herewith, the composite laminate preferably includes the composite active particulates as described above and further includes a solid-electrolytic phase extending between (i.e. is continuous in the laminate) the composite active particulates. In one preferable instance, the solid-electrolytic phase both extends between the composite active particulates and penetrates the composite active particulates. Put another way, the solid-electrolytic phase is preferably carried within the pores of the individual composite active particulates and between the composite active particulates. While the features of the specific components of the composite of active particulates in the solid-electrolytic phase are described above, the anode can further include a conductive carbon carried by the solid-electrolytic phase and between the active particulates. In another instance, the solid-electrolytic continuous phase and the solid-electrolytic phase carried in the pores can have different compositions. Independent on the composition of the phases, the solid-electrolytic continuous phase is preferably ionically connected to the solid-electrolytic phase carried in the pores of the heterogeneous matrix. That is, phases provide an ionic pathway for, for example, lithium ions to traverse the laminate and penetrate the active particulates. In another preferable instance, the solid-electrolytic continuous phase is covalently affixed to the solid-electrolytic phase carried in the pores of the heterogeneous matrix.

A fourth embodiment is a process for preparing an anode (e.g. the above described composite laminate) for use in a lithium ion battery. The process, analogous to the process of forming the composite active particulate described above, can include admixing an active particulate and a solution thereby allowing the solution to penetrate pores of the active particulate. Thereafter, this admixture of the active particulate and the solution can be coated onto a current collector thereby forming a coating on the current collector. The solvent can then be removed from the coating on the current collector thereby providing a composite laminate that includes the composite active particulates and a solid-electrolytic phase carried on the current collector.

The admixture of the active particulate and the solution, preferably includes a ratio of the active particulate to the solid-electrolyte particulates of about 10:1, about 9:1, about 8:1, about 7:1, about 6:1 about 5:1 about 4:1, about 3:1, about 2:1, about 1:1, about 1:2, about 1:3, about 1:4, about 1:5, about 1:6, about 1:7, about 1:8, about 1:9, or about 1:10 on a dry basis. The ratio of the active particulate to the solid-electrolyte particulates can, alternatively, be in the range of about 10:1, about 9:1, about 8:1, about 7:1, about 6:1 about 5:1 about 4:1, about 3:1, about 2:1, about 1:1, to about 1:2, about 1:3, about 1:4, about 1:5, about 1:6, about 1:7, about 1:8, about 1:9, or about 1:10 on a dry basis. Preferably, the ratio is about 2:1 to about 1:10, about 1:1 to about 1:5, about 1:1 to about 1:4, about 1:1 to about 1:3, or about 1:1 to about 1:2.

While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A composite active particulate anode component comprising:
    an admixture of a heterogeneous matrix and a lithium metal sulfide;
    the heterogeneous matrix comprising a carbon phase intermixed with silicon nanoparticles, and a plurality of pores therewithin; and
    where the lithium metal sulfide is carried within the plurality of pores of the heterogeneous matrix and the lithium metal sulfide is comprised of one or more of lithium borosulfide or lithium phosphosulfide.

2. The composite active particulate anode component of claim 1, wherein the
    lithium metal sulfide is adjacent to silicon nanoparticles.

3. The composite active particulate anode component of claim 1, wherein the plurality of pores in the heterogeneous matrix have a pore volume; and wherein the lithium metal sulfide occupies between about 5% and about 75% of the pore volume.

4. The composite active particulate anode component of claim 1, wherein the carbon phase includes a reduced carbon and a conductive carbon.

5. The composite active particulate anode component of claim 4, wherein the conductive carbon is selected from the group consisting of carbon nanotubes, carbon nanofibers, graphene, graphene oxide, reduced graphene oxide, mesocarbon microbeads, or a mixture thereof.

6. The composite active particulate anode component of claim 1 further comprising a particle electrical conductivity in a range of about $10^{-3}$ to about $10^{-5}$ S/cm.

7. The composite active particulate anode component of claim 1 further comprising a particle ionic conductivity in a range of about $10^{-5}$ to about $10^{-1}$ S/cm.

8. A composite laminate carried on a current collector, the composite laminate comprising:
the composite active particulate anode component of claim 1 carried in a solid electrolytic continuous phase.

9. The composite laminate of claim 8, wherein the solid-electrolytic continuous phase is ionically connected to the lithium metal sulfide carried in the plurality of pores of the heterogeneous matrix.

* * * * *